(12) United States Patent
Murphy et al.

(10) Patent No.: US 11,062,038 B2
(45) Date of Patent: Jul. 13, 2021

(54) METHOD AND SYSTEM FOR IDENTITY AND CREDENTIAL PROTECTION AND VERIFICATION VIA BLOCKCHAIN

(71) Applicant: MASTERCARD INTERNATIONAL INCORPORATED, Purchase, NY (US)

(72) Inventors: Anthony Paul Murphy, Singapore (SG); Timothy Warren Mattingly, Chesterfield, MO (US); Peter Julian Reyes Flor, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 81 days.

(21) Appl. No.: 16/671,296

(22) Filed: Nov. 1, 2019

(65) Prior Publication Data

US 2020/0065501 A1    Feb. 27, 2020

Related U.S. Application Data

(62) Division of application No. 15/715,784, filed on Sep. 26, 2017, now Pat. No. 10,503,916.

(Continued)

(51) Int. Cl.
*H04L 29/06* (2006.01)
*G06F 21/60* (2013.01)
(Continued)

(52) U.S. Cl.
CPC .......... *G06F 21/602* (2013.01); *G06F 21/62* (2013.01); *G06F 21/6245* (2013.01);
(Continued)

(58) Field of Classification Search
None
See application file for complete search history.

(56) References Cited

U.S. PATENT DOCUMENTS 7,206,934 B2   4/2007   Pabla et al.
7,831,823 B2   11/2010  Ginter et al.
(Continued)

FOREIGN PATENT DOCUMENTS

CN    104486314 A    4/2015
CN    105591753      5/2016
(Continued)

OTHER PUBLICATIONS

PCT/US2017/050932, "Invitation to Pay Additional Fees and a Partial International Search Report Annex to (Form PCT/ISA/206)", European Patent Office, dated Jan. 2, 2018, 15 pages.

(Continued)

*Primary Examiner* — Maung T Lwin
(74) *Attorney, Agent, or Firm* — Buchanan Ingersoll & Rooney PC

(57) ABSTRACT

A method for distributed storage of identity data includes: receiving entity data for a plurality of entities, the data including an associated public key, associated attributes, and a geographic jurisdiction, and where one entity is a subordinate; generating a data file for each entity including the associated attributes and public key, and where the subordinate entity's data file includes a digital signature associated with a superior entity; generating an identity value for each entity via hashing the associated data file; and storing, in a distributed hash table, a key-value pair for each entity, wherein the key is the associated identity value, the value comprises the associated attributes, and the key-value pair is stored in a physical data storage device located in a geographic area corresponding to the associated geographic jurisdiction.

10 Claims, 7 Drawing Sheets

Related U.S. Application Data

(60) Provisional application No. 62/404,885, filed on Oct. 6, 2016.

(51) Int. Cl.
| | |
|---|---|
| *G06F 21/62* | (2013.01) |
| *G06F 21/64* | (2013.01) |
| *H04L 9/06* | (2006.01) |
| *H04L 9/30* | (2006.01) |
| *H04L 9/32* | (2006.01) |
| *H04L 29/08* | (2006.01) |

(52) U.S. Cl.
CPC ............ *G06F 21/64* (2013.01); *H04L 9/0637* (2013.01); *H04L 9/30* (2013.01); *H04L 9/3239* (2013.01); *H04L 9/3247* (2013.01); *H04L 63/06* (2013.01); *H04L 63/0442* (2013.01); *H04L 63/102* (2013.01); *H04L 67/104* (2013.01); *H04L 2209/38* (2013.01)

(56) References Cited

U.S. PATENT DOCUMENTS

| | | | |
|---|---|---|---|
| 8,204,992 | B2 | 6/2012 | Arora et al. |
| 2004/0064568 | A1 | 4/2004 | Arora et al. |
| 2004/0064693 | A1 | 4/2004 | Pabla et al. |
| 2005/0071630 | A1 | 3/2005 | Thornton et al. |
| 2008/0077530 | A1 | 3/2008 | Banas et al. |
| 2008/0077791 | A1* | 3/2008 | Lund ................. H04L 63/166 713/156 |
| 2008/0234047 | A1 | 9/2008 | Nguyen |
| 2009/0307486 | A1* | 12/2009 | Grajek ................. H04L 63/123 713/156 |
| 2009/0323972 | A1 | 12/2009 | Kohno et al. |
| 2010/0100579 | A1 | 4/2010 | Tsai |
| 2010/0125670 | A1 | 5/2010 | Dondeti et al. |
| 2011/0055585 | A1 | 3/2011 | Lee |
| 2011/0179288 | A1 | 7/2011 | Catrein et al. |
| 2012/0110341 | A1 | 5/2012 | Beigi |
| 2014/0244998 | A1 | 8/2014 | Amenedo et al. |
| 2015/0006895 | A1 | 1/2015 | Irvine |
| 2015/0059003 | A1 | 2/2015 | Bouse |
| 2016/0028552 | A1 | 1/2016 | Spanos et al. |
| 2016/0162897 | A1 | 6/2016 | Feeney |
| 2016/0328713 | A1* | 11/2016 | Ebrahimi ................. H04L 9/14 |
| 2018/0006823 | A1 | 1/2018 | Carbajal et al. |

FOREIGN PATENT DOCUMENTS

| | | |
|---|---|---|
| JP | H10-135943 A | 5/1998 |
| JP | 5858506 B1 | 2/2016 |
| WO | 2016022864 A2 | 2/2016 |
| WO | 2016/154001 A1 | 9/2016 |

OTHER PUBLICATIONS

Office Action (First Examination Report) dated Sep. 30, 2020, by the Intellectual Property India in corresponding India Patent Application No. 201817006811 with an English Translation of the Office Action. (10 pages)

Ohashi et al. "Proposal and implementation of information registration method directed to smart transformation of digital contents into properties," Technical report from IEICE (Institute of Electronics, Information and Communication Engineers), Japan, IEICE, (May 5, 2016), vol. 116, No. 23, pp. 13-18.

Takeda et al., "Designing of distributed authentication systems for P2P networks," Research report from Information Processing Society of Japan, Information processing Society of Japan, (Jun. 12, 2008), vol. 2008, No. 54, pp. 63-68.

Office Action (Notification of Reasons for Refusal) dated May 19, 2020, by the Japanese Patent Office in corresponding Japanese Patent Application No. 2019-518389 and an English Translation of the Office Action. (8 pages).

The Search Report and Written Opinion dated Jun. 2, 2020, by the Intellectual Property Office of Singapore in corresponding Singapore Patent Application No. 11201902266P. (11 pages)

Office Action dated Mar. 3, 2021, by the Australian Intellectual Property Office in corresponding Australian Patent Application No. 2020203406. (5 pages).

\* cited by examiner

METHOD AND SYSTEM FOR IDENTITY AND CREDENTIAL PROTECTION AND VERIFICATION VIA BLOCKCHAIN

FIELD

The present disclosure relates to the storage and verification and identity and credential data, specifically the use of distributed storage and storage via blockchain for protection of identity and credential data and the verification thereof.

BACKGROUND

The identity of an individual or other type of entity is a valuable piece of information. The identity of an entity may be important for a business deal, contract, payment to be made, purchase, or other type of transaction or interaction between multiple parties. In many cases, an entity may be required to provide proof of their identity as part of a transaction or other interaction. Traditionally, such proof has often been provided via government identification, credit cards, business cards, correspondence, etc. In these instances, the provided proof may be inaccurate (e.g., an individual may no longer be employed but still retain business cards for prior employment) or may be entirely fabricated in such a way that may be difficult to identify. In such instances, it may be difficult for an entity to disprove a false identity, leading to an interaction with an inauthentic individual or entity.

Thus, there is a need for a technical solution to provide for the immutable storage of identity and credential data that may prevent fabrication and inaccuracies.

SUMMARY

The present disclosure provides a description of systems and methods for the distributed and immutable storage of identity data. The use of a distributed hash table to store identity and credential attributes and other data may ensure for fast and efficient accessibility of data, while still maintaining compliance with regulations regarding the on-site storage of such data. In addition, the use of a blockchain for the storage of identity and credential data may provide for an immutable storage of such data that can provide an accurate verification thereof and also prevent the fabrication of such data.

A method for distributed storage of identity data includes: receiving, by a receiving device of a processing server, entity data for a plurality of entities, wherein the entity data includes at least an associated public key, one or more associated attributes, and a geographic jurisdiction, and where at least one of the plurality of entities is indicated as being a subordinate; generating, by a generation module of the processing server, a data file for each of the plurality of entities, wherein each data file includes at least the one or more associated attributes and associated public key, and where the data file for an entity indicated as a subordinate includes a digital signature associated with a superior entity; generating, by a hashing module of the processing server, an identity value for each of the plurality of entities via application of one or more hashing algorithms to the data file generated for the respective entity; and executing, by a querying module of the processing server, a query on a distributed hash table to store, for each of the plurality of entities, a key-value pair, wherein the key is the identity value for the respective entity and the value comprises at least each of the one or more associated attributes for the respective entity, wherein the distributed hash table is comprised of a plurality of physical data storage devices, each data storage device being located in a geographic area, and where each key-value pair is stored in a physical data storage device where the associated geographic area corresponds to the geographic jurisdiction included in the entity data for the respective entity.

A method for immutable storage of identity data includes: storing, in a memory of a processing server, a blockchain, wherein the blockchain is comprised of a plurality of blocks including, each block comprised of block data and a block header that includes at least a timestamp; receiving, by a receiving device of a processing server, entity data for a plurality of entities, wherein the entity data includes at least an associated public key, one or more associated attributes, and a geographic jurisdiction, and where at least one of the plurality of entities is indicated as being a subordinate; generating, by a generation module of the processing server, a data file for each of the plurality of entities, wherein each data file includes at least the one or more associated attributes and associated public key, and where the data file for an entity indicated as a subordinate includes a digital signature associated with a superior entity; generating, by a hashing module of the processing server, an identity value for each of the plurality of entities via application of one or more hashing algorithms to the data file generated for the respective entity; and generating, by the generation module of the processing server, a new block comprised of a new block header and block data, wherein the block header includes at least a timestamp and a hash value of the block header of a most recent block of the plurality of blocks based on the timestamp included in the block header of each respective block, and wherein the block data includes at least the generated identity value for each of the plurality of entities.

A system for distributed storage of identity data includes: a receiving device of a processing server configured to receive entity data for a plurality of entities, wherein the entity data includes at least an associated public key, one or more associated attributes, and a geographic jurisdiction, and where at least one of the plurality of entities is indicated as being a subordinate; a generation module of the processing server configured to generate a data file for each of the plurality of entities, wherein each data file includes at least the one or more associated attributes and associated public key, and where the data file for an entity indicated as a subordinate includes a digital signature associated with a superior entity; a hashing module of the processing server configured to generate an identity value for each of the plurality of entities via application of one or more hashing algorithms to the data file generated for the respective entity; and a querying module of the processing server configured to execute a query on a distributed hash table to store, for each of the plurality of entities, a key-value pair, wherein the key is the identity value for the respective entity and the value comprises at least each of the one or more associated attributes for the respective entity, wherein the distributed hash table is comprised of a plurality of physical data storage devices, each data storage device being located in a geographic area, and where each key-value pair is stored in a physical data storage device where the associated geographic area corresponds to the geographic jurisdiction included in the entity data for the respective entity.

A system for immutable storage of identity data includes: a memory of a processing server configured to store a blockchain, wherein the blockchain is comprised of a plurality of blocks, each block comprised of block data and a block header, and wherein the block header includes at least a timestamp; a receiving device of a processing server configured to receive entity data for a plurality of entities, wherein the entity data includes at least an associated public key, one or more associated attributes, and a geographic jurisdiction, and where at least one of the plurality of entities is indicated as being a subordinate; a generation module of the processing server configured to generate a data file for each of the plurality of entities, wherein each data file includes at least the one or more associated attributes and associated public key, and where the data file for an entity indicated as a subordinate includes a digital signature associated with a superior entity; and a hashing module of the processing server configured to generate an identity value for each of the plurality of entities via application of one or more hashing algorithms to the data file generated for the respective entity, wherein the generation module of the processing server is further configured to generate a new block comprised of a new block header and block data, wherein the block header includes at least a timestamp and a hash value of the block header of a most recent block of the plurality of blocks based on the timestamp included in the block header of each respective block, and wherein the block data includes at least the generated identity value for each of the plurality of entities.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Figure 1:
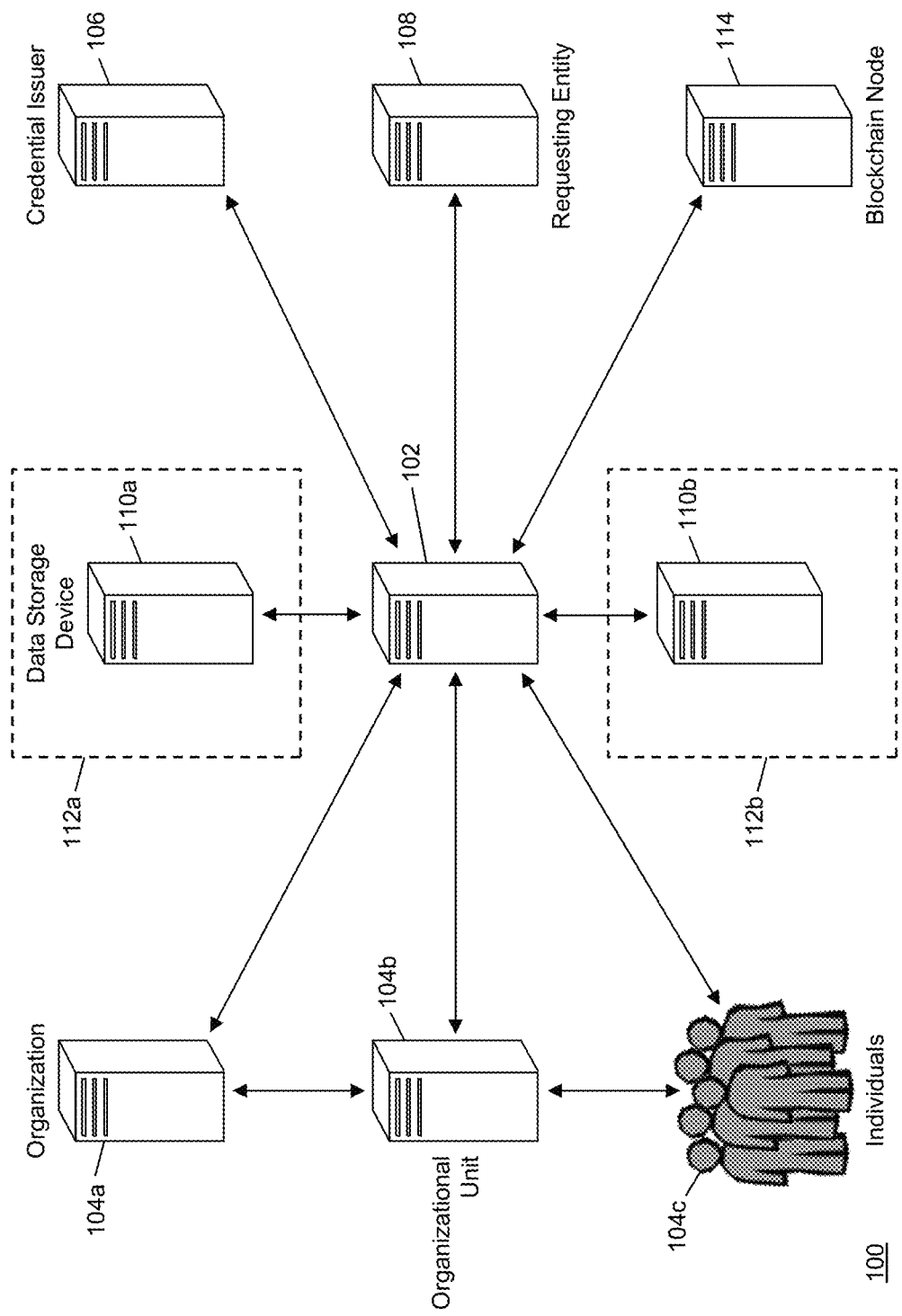
FIG. 1 is a block diagram illustrating a high level system architecture for the distributed and immutable storage of identity and credential data and verification thereof in accordance with exemplary embodiments.

System for the Distributed and Immutable Storage of Identity and Credential Data FIG. 1 illustrates a system 100 for the distributed and immutable storage of identity and credential data for entities and the verification thereof.

The system 100 may include a processing server 102. The processing server 102, discussed in more detail below, may be configured to manage the storage and verification of identity and credential data for a plurality of entities 104. The entities 104, as illustrated in FIG. 1, may be any type of entity that may have an identity and/or credentials associated therewith. In some instances, entities 104 may have relationships with other entities 104, which may be reflected in the identity data managed, stored, and verified by the processing server 102.

For example, the entities 104 may include an organization 104a, which may be comprised of a plurality of organizational units 104b. Each of the organizational units 104b may be staffed by a plurality of individuals 104c that work for each organizational unit 104b as part of the greater organization 104a. In such an example, the identities of each of the entities 104 may reflect their relationship with the rest of the entities 104, such that, for instance, the verification of an identity of an individual 104c would thereby verify the individual's employment at the organizational unit 104b, and, by extension, under the organization 104a.

The processing server 102 may be configured to receive a plurality of identity attributes for each of the entities 104 using a suitable communication network and method. In some embodiments, the processing server 102 may receive the attributes directly from the respective entities 104. For instance, the processing server 102 may receive the attributes from each of the organization 104a, organizational units 104*b*, and individuals 104*c*. In another example, the processing server 102 may receive the identity attributes from the organization 104*a* and/or organizational units 104*b*, which may include the attributes for the other entities 104 associated therewith (e.g., an organizational unit 104*b* may provide identity attributes for each individual 104*c* related thereto. The processing server 102 may receive the identity attributes via an application programming interface or other suitable method for the conveyance of data thereto.

Identity attributes may be attributes directly associated with the related entity 104. Identity attributes may include, for example, name, street address, tax identification number, registration number, e-mail address, country code, date of birth, etc. In some cases, the identity attributes may vary for each type of entity 104 for which attributes may be received. For example, the identity attributes for an organizational unit 104*b* may include a country code, address, and business registration number, whereas the identity attributes for an individual 104*c* thereof may include a name, employee number, e-mail address, and date of birth.

Included in, or accompanied with, the identity attributes for each entity 104 may be a public key associated therewith. The public key may be part of a key pair directly associated with the respective entity 104, where the entity 104, or another party operating on behalf of the entity 104, may be in possession of the corresponding private key. For instance, the processing server 102 may receive a public key for each of the organization 104*a*, organizational units 104*b*, and individuals 104*c*, where the corresponding private keys for each of the individuals 104*c* may be held and managed by their associated organizational units 104*b*.

In some embodiments, the private key for an entity 104 may be used to generate a digital signature for use in proving the relationship between the entity 104 and a subordinate entity. For instance, the organization 104*a* may generate a digital signature using a private key associated therewith, which may be included in the identity attributes for each related organizational unit 104*b*. The processing server 102 may, in possession of the corresponding public key for the organization 104*a* (e.g., provided in or with its identity attributes), be configured to verify the digital signature provided for each organizational unit 104*b*. The verified digital signatures may thus be included in or with the identity attributes of the organizational unit 104*b* as verified proof of the relationship between the organizational unit 104*b* and organization 104*a*. Similarly, the identity attributes for each individual 104*c* may include a verified digital signature generated by the private key of the associated organizational unit 104*b*.

The processing server 102 may be configured to store the identity attributes for each of the entities 104. In some embodiments, the processing server 102 may be configured to store the identity attributes for each entity 104 in a hash table as a plurality of key-value pairs. The value in each key-value pair may include the identity attributes for a given entity 104. The corresponding key in the key-value pair may be a singular value representative of an identity of the entity 104. In an exemplary embodiment, the key may be a hash value generated for the entity 104 to be used as a representation of the identity of the entity 104. The hash value may be generated via the application of one or more hashing algorithms to the identity attributes for the entity 104 by the processing server 102. For example, the processing server 102 may generate, or the identity attributes may be delivered in, a data file that includes each of the identity attributes, where the hashing algorithm(s) may be applied to the data file to generate a hash value related thereto. The hash value may then be used as the identity for the entity 104, and key in the corresponding key-value pair, and stored in the hash table accordingly.

In some embodiments, the hash table may be a distributed hash table, where the key-value pairs associated therewith may be stored in a plurality of different data storage devices 110, which may be distributed over a plurality of different geographic areas 112. For instance, as illustrated in FIG. 1, the processing server 102 may store the key-value pairs into multiple data storage devices 110, illustrate as data storage devices 110*a* and 110*b*, which may be located in separate geographic areas 112, illustrated as geographic areas 112*a* and 112*b*. In some instances, the key-value pairs may be stored in a data storage device 110 that is located in a geographic area 112 associated with a geographic jurisdiction related to the associated entity 104. For example, an organizational unit 104*b* and the associated individuals 104*c* may each be associated with a specific geographic jurisdiction, such as a specific country, where the associated key-value pairs may be stored in a data storage device 110 located in that specific country.

In some cases, the storage of identity attributes, or of credential data, such as discussed in more detail below, may be subject to one or more rules or regulations, such as may be issued by an agency associated with a geographic area 112. In such cases, the processing server 102 may store the key-value pairs in data storage devices 110 in compliance with the applicable rules or regulations. For example, a governmental agency that has jurisdiction over a geographic area 112*a* may require that identity data for any entity 104 that operates in the geographic area 112*a* be stored physically on-site in that geographic area 11*a*2. In such an example, the processing server 102 may ensure that the key-value pairs for each of the entities 104 in the geographic area 112*a* be stored in the data storage device 110*a* located in the geographic area 112*a*. In such instances, the geographic jurisdiction of an entity 104 may be identified by the identity attributes (e.g., such as an address, country code, jurisdiction, etc. included therein), or may be identified in data accompanying the identity attributes, such as an organizational unit 104*b* providing their applicable geographic jurisdiction, but not as included in the identity attributes that are used to establish their identity.

In some embodiments, the processing server 102 may also be configured to store credential data associated with an entity 104. In such embodiments, the system 100 may include a credential issuer 106. The credential issuer 106 may be any type of entity configured to issue credentials for an entity 104 that may be used for any suitable function, such as a financial institution, governmental agency, corporation, building operator, etc. The credential issuer 106 may electronically transmit credential data for one or more entities 104 to the processing server 102 using a suitable communication network and method. In some instances, the processing server 102 may have an application programming interface for use in the submission of credential data by credential issuers 106.

The credential data may include a plurality of credential attributes. The credential attributes may include at least a claim related to the credential, an issuance date and/or period of validity for the credential, and an issuer signature. The issuer signature may be a digital signature generated by the credential issuer 106, such as using a private key of a key pair associated with the credential issuer 106. In such cases, the corresponding public key may be provided to the processing server 102 for verification of the issuer signature. In some cases, the credential attributes may include additional data, such as a credential type, a name or other identification associated with the credential issuer 106. In some instances, credential attributes may include information identifying one or more related entities 104, such as entity signatures (e.g., generated using their associated private keys and verified via the corresponding public key), the entity identity, etc.

The processing server 102 may also be configured to generate a hash value of the credential attributes to be representative of the credential. In some cases, the hash value may be generated using the same hashing algorithm(s) used to generate the identity for an entity 104. The hash value that represents the credential may be generated via application of the hashing algorithm(s) to the credential attributes, and may, in some instances, be applied to a data file that includes all of the credential attributes. In some embodiments, the hash value may be used as a key in a key-value pair for the credential, which may be stored in the data storage devices 110 of the processing server 102 (e.g., and in a geographic area 112 associated with the credential, if applicable). In other embodiments, the credential and/or the credential attributes may be stored in the value of a key-value pair of an entity 104 associated with the credential, if applicable.

In some embodiments, the processing server 102 may also be configured to store identities and, if applicable, credentials to a blockchain. The blockchain may be a ledger used to store identities, credentials, and information related thereto to serve as an immutable record of the identities and credentials for use in verification thereof. In some cases, the blockchain may be a private or semi-private blockchain, where the addition of new blocks to the blockchain may only be performed by authorized blockchain nodes 114, such as to prevent the addition of data that may compromise the accuracy of the data stored therein. In some cases, the processing server 102 may be a blockchain node for the blockchain and may be configured to generate new blocks for addition thereto. In other cases, the processing server 102 may be configured to electronically transmit data for addition to the blockchain to one or more external blockchain nodes 114 associated with the blockchain. In some cases, the processing server 102 may generate a block, which may be transmitted to a blockchain node 114 for verification and addition to the blockchain using traditional methods.

The blockchain may be comprised of a plurality of blocks. Each block may be comprised of at least a block header and block data, where the block data may include identities, credentials, and data associated therewith. For instance, the identities and credentials included in the block data may be accompanied by status indicators, which may indicate changes in status of the associated identity or credential at the time the block is added to the blockchain. For example, when a new identity is generated, it may be added to the blockchain with a status indicator indicating that the identity was created. When an identity is revoked (e.g., an organizational unit 104b revokes the identity of an individual 104c that is no longer employed), the identity may be added to a new block in the blockchain with a new status indicator indicative of the revocation. Similarly, when identity attributes for an entity 104 are changed, the identity may be re-generated (e.g., which may be a different value due to the change in attributes), and then added to a new block in the blockchain. In such a case, the prior identity may be revoked, such that it is not used in place of the updated identity. In some such cases, the revocation may refer to the new identity for the entity 104.

Each block header may include at least a timestamp and a hash value, where the hash value is generated via hashing of the block header of a prior block in the block chain, the prior block being the block most recently added to the blockchain before that block. The most recent block may be identified based on the timestamp included in the corresponding block header. Each block header may also include a hash or other value associated with the block data included in the block, such as a Merkle root of each of the data values included in the block data. The inclusion of the hash value of the earlier block header in a new block header that is being added ensures immutability of the blockchain as any changes to a block would result in a different hash value being generated for that block header, which would change the hash values for each block header for every subsequent block. As such, the consistency of the hash values for the block headers ensures that the blockchain has not been tampered with, thus preventing inaccuracies and fabrications for identities and credentials.

The processing server 102 may be further configured to verify identities and credentials and attributes associated therewith on behalf of third parties. For instance, an individual 104c may provide their identity to a requesting entity 108 as part of a transaction. For example, an individual 104c seeking a loan to a financial institution as the requesting entity 108 may provide their identity as proof of employment and their position at an organizational unit 104b. The requesting entity 108 may electronically transmit a verification request to the processing server 102 using a suitable communication network and method, the verification request including the identity of the individual 104c and, in some embodiments, also including the specific identity attributes to be verified (e.g., such as the organizational unit 104b and the individual's position in the above example). In some cases, the verification request may be submitted through an application programming interface or other platform provided by the processing server 102.

The processing server 102 may receive the request, and may first consult the blockchain to identify the status of the provided identity. The processing server 102 may identify the most recent block in the blockchain (e.g., as identified via the timestamps included in block headers) that includes the identity in the block data, and may identify its corresponding status indicator. For instance, if the status of the identity is that it was revoked, the verification may yield a negative result. If the identity is still active, the processing server 102 may then retrieve the associated identity attributes from the data storage devices 110, using the identity as a key and retrieving the corresponding key-value pair. The processing server 102 may verify that the identity attributes for the entity 104 match the alleged attributes, and may provide the result of the verification back to the requesting entity 108. In some instances, the processing server 102 may provide the value for one or more of the identity attributes to the requesting entity 108, such as for specifically requested values. The requesting entity 108 may then have an accurate, third party verification of the individual's identity. The processing server 102 may similarly be used to verify credentials presented to a requesting entity 108 by an entity 108 whose credentials are stored by the processing server 102.

In some embodiments, the blockchain used to store the identity and credential data may be configured to use smart contracts. Smart contracts are computer protocols that may be used to perform one or more actions upon satisfaction of one or more clauses therein. Once the clause or clauses of the smart contract are satisfied, one or more actions may be executed by the smart contract to achieve an intended result. In the system 100, smart contracts may be used to accomplish management of identities and credentials and associated attributes. For example, a newly issued credential may be added to the blockchain with a smart contract set to execute once an expiration date of the credential has passed, which may automatically revoke the credential. In such an example, upon execution of the smart contract, the processing server 102 may be notified to revoke the credential, and may then submit the credential and a revocation status notification for inclusion in a new block added to the blockchain. In another example, the organizational unit 104b may be a business organization that has a credit score associated therewith as an attribute. The blockchain may include a smart contract that is executed once the organizational unit 104b has performed one of a predetermined list of actions (e.g., been issued new credit, canceled a credit line, achieved a specified transaction volume, etc.), to update credit score identity attribute for the organizational unit 104b. Upon execution of the action, the processing server 102 may update the attribute, generate a new identity for the organizational unit 104b (e.g., due to the change in the attribute), revoke the prior identity, and add the new identity with active status to the blockchain.

The methods and systems discussed herein enable the processing server 102 to securely store identity and credential data in a manner that is immutable and difficult, if not impossible, to fabricate or misrepresent. The use of a distributed hash table to store identity and credential attributes enables the processing server 102 to store the data in a manner that complies with the applicable rules and regulations of any geographical jurisdiction, while still maintaining network efficiency, while the use of a blockchain for storage of the identities and credentials ensures for an immutable record of the data to assist in the accurate verification of identities and credentials for third party entities.

Processing Server

Figure 2:
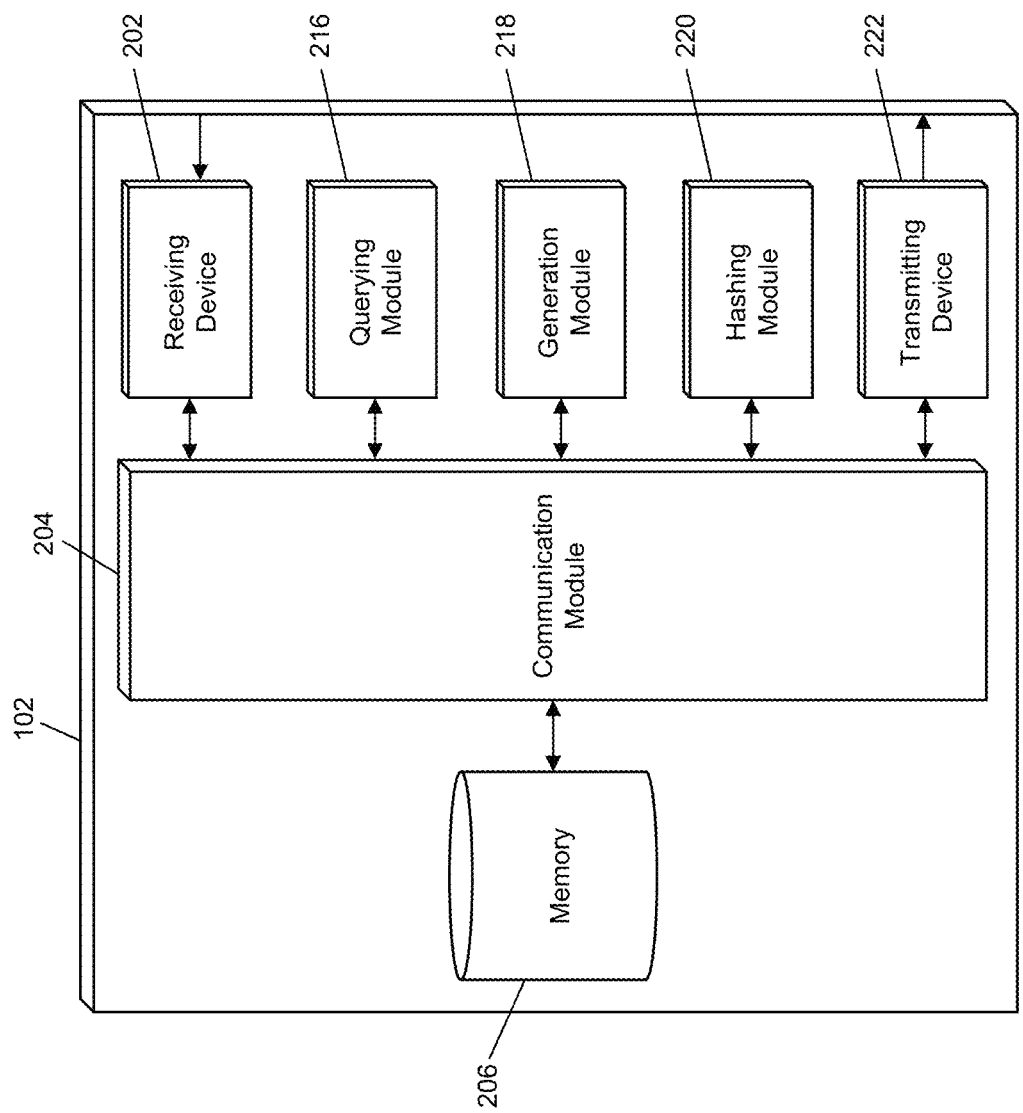
FIG. 2 is a block diagram illustrating the processing server of the system of FIG. 1 for the distributed and immutable storage of identity and credential data in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 700 illustrated in FIG. 7 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from entities 104, credential issuers 106, requesting entities 108, data storage devices 110, blockchain nodes 114, and other systems and entities via one or more communication methods, such as near field communication, physical contact points, Bluetooth, the Internet, local area networks, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by entities 104 and credential issuers 106 that are superimposed or otherwise encoded with identity and/or credential attributes for storage by the processing server 102. The receiving device 202 may also be configured to receive data signals electronically transmitted by entities 104 and other parties that are superimposed or otherwise encoded with smart contracts for addition to the blockchain. The receiving device 202 may be further configured to receive data signals electronically transmitted by requesting entities 108, which may be superimposed or otherwise encoded with verification requests, requesting verification of identities and/or credentials. The receiving device 202 may also be configured to receive data signals electronically transmitted by the data storage devices 110 for the retrieval of data stored therein. In some instances, the receiving device 202 may be configured to receive data signals electronically transmitted by blockchain nodes 114, which may be superimposed or otherwise encoded with blockchain data.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilizes various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 216, generation module 218, hashing module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include a memory 206. The memory 206 may be configured to store data for use by the processing server 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The memory 206 may be configured to store the blockchain, such as in instances where the processing server 102 may be a blockchain node for the blockchain. The memory 206 may also be configured to store some or all of the distributed hash table, as part of, or in addition to, the data storage devices 110. For instance, the memory 206 may store an aggregated, redundant copy of the distributed hash table that is stored in the data storage devices 110. In another example, the memory 206 may store a portion of the distributed hash table to store identities and credentials associated with a geographic area 104 in which the processing server 102 is located. The memory 206 may also be configured to store any additional data suitable for use by the processing server 102, such as hashing algorithms, smart contract execution data, etc.

The processing server 102 may include a querying module 216. The querying module 216 may be configured to execute queries on databases to identify information. The querying module 216 may receive one or more data values or query strings, and may execute a query string based thereon on an indicated database, such as the memory 206, to identify information stored therein. The querying module 216 may then output the identified information to an appropriate engine or module of the processing server 102 as necessary. The querying module 216 may, for example, execute a query on the memory to identify the values for a key-value pair, using a generated identity or credential as the key to access the associated attributes.

The processing server 102 may also include a generation module 218. The generation module 218 may be configured to generate data for use in performing the functions of the processing server 102 as discussed herein. The generation module 218 may receive instructions as input, which may be used to generate data, and the generated data output to one or more engines or modules of the processing server 102. In some instances, the instructions input to the generation module 218 may be accompanied by data for use therewith. For example, the generation module 218 may be configured to generate a data file for an entity that includes the associated identity attributes, which may be stored as the value in a corresponding key-value pair and be used in the generation of the associated identity. The generation module 218 may also be configured to generate verification results, such as based on verifications of identities and/or credentials by the processing server 102. In some embodiments, the generation module 218 may be configured to generate blocks for addition to the blockchain.

The processing server 102 may also include a hashing module 220. The hashing module 220 may be configured to hash data for the processing server 102 for the generation of hash values. The hashing module 220 may receive data to be hashed as input, may generate hash values via the application of one or more hashing algorithms thereto, and may output the resulting hash value to another module or engine of the processing server 102. In some embodiments, the input may include the one or more hashing algorithms or indications thereof. In other embodiments, the hashing module 220 may be configured to identify the hashing algorithm(s) (e.g., in the memory 206) to be used. The hashing module 220 may be configured, for example, to generate hash values of identity attributes and credential attributes to serve as identities and credentials, respectively, such as via the application of hashing algorithm(s) to the corresponding data files (e.g., generated by the generation module 218). In another example, the hashing module 220 may be configured to generate a hash value for a block header for a blockchain block for inclusion in a new block header, such as may be generated by the generation module 218.

The processing server 102 may also include a transmitting device 222. The transmitting device 222 may be configured to transmit data over one or more networks via one or more network protocols. In some instances, the transmitting device 222 may be configured to transmit data to entities 104, credential issuers 106, requesting entities 108, data storage devices 110, blockchain nodes 114, and other entities via one or more communication methods, such as near field communication, physical contact points, Bluetooth, radio frequency, the Internet, local area networks, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to data storage devices 110 that are superimposed or otherwise encoded with key-value pairs and/or data associated therewith for storage in the data storage devices 110. In some instances, the data signals may be superimposed or otherwise encoded with queries for execution by querying module 216 for the insertion and/or updating of data in the data storage devices 110. The transmitting device 222 may also be configured to electronically transmit data signals to blockchain nodes 114, which may be superimposed or otherwise encoded with identity and credential data or generated blocks for addition to the associated blockchain. The transmitting device 222 may be further configured to electronically transmit data signals to requesting entities 108 that are superimposed or otherwise encoded with verification results, such as generated based on verification of credentials or identities.

Identity and Credential Generation

Figure 3:
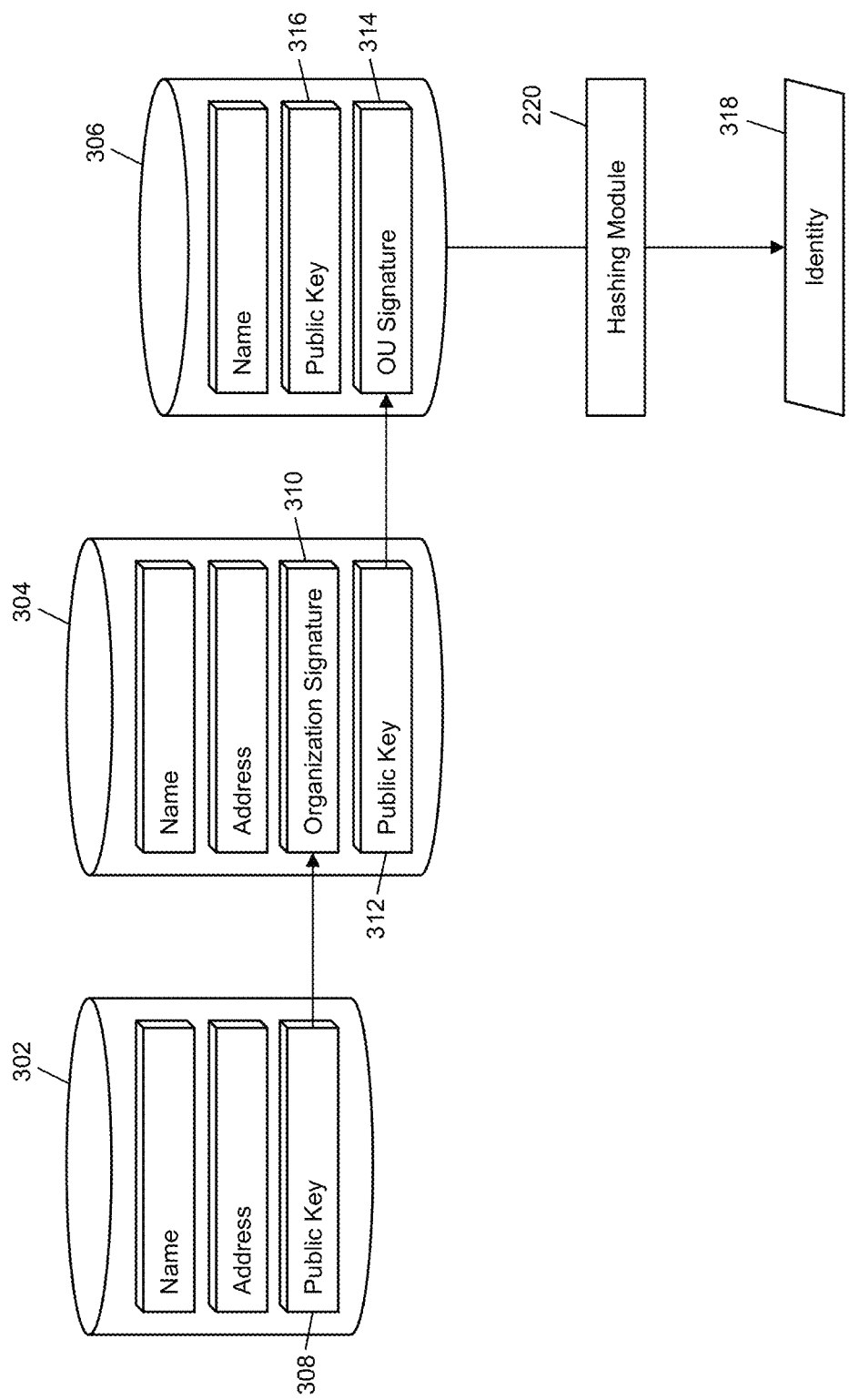
FIG. 3 is a block diagram illustrating data relationships between entity identities and the hashing thereof for use in the system of FIG. 1 in accordance with exemplary embodiments.

FIG. 3 illustrates the indication of a relationship between identities for multiple associated entities as well as the generation of identities based on entity identity attributes.

The processing server 102 may receive (e.g., via the receiving device 202) identity data for a plurality of different, associated entities. The identity data may include identity data 302 for an organization 104a, identity data 304 for an organizational unit 104b that operates under the organization 104a, and identity data 306 for an individual 104c that operates under the organizational unit 104b. As illustrated in FIG. 3, the identity data for an entity 104 that is subordinate to another entity 104 may include data indicative of the relationship with the superior entity 104.

The identity data 302 for the organization 104a, having no superior entity, may include a plurality of identity attributes that may not include a digital signature of any other entity, but may include at least a public key 308 associated with the organization 104*a*. The public key 308 may be part of a key pair associated with the organization 104*a*, where the corresponding private key may be used to generate an organization signature 310, which may be a digital signature generated via the private key that is verifiable using the public key 308.

The organization signature 310 may be included in the identity data 304 associated with the organizational unit 104*b* that operates under the organization 104*a*, as the organizational unit 104*b* may be subordinate to the organization 104*a*. In addition to the organization signature 310 and other identity attributes, the identity data 304 may include a public key 312 associated with the organizational unit 104*b*. The public key 312 may be part of a key pair associated with the organizational unit 104*b*, where the corresponding private key may be used to generate an organizational unit (OU) signature 314. The OU signature 314 may be a digital signature generated via the private key that is verifiable using the public key 312.

The OU signature 314 may be included in the identity data 306 that is associated with the individual 104*c* that operates as a subordinate of the organizational unit 104*b*. In addition to the OU signature 314 and other identity attributes, the identity data 306 may include its own public key 316 associated therewith. The public key 316 may be used to verify digital signatures generated via the corresponding private key. In some cases, the corresponding private key may be possessed by the superior organizational unit 104*b* or organization 104*a*, rather than by the associated individual 104.

To generate the identity for an entity 104, the identity data associated therewith, such as the identity data 306 for the individual 104*c*, may be included in a data file generated by the generation module 218 of the processing server 102. For instance, the identity data 306 illustrated in FIG. 3 may be a data file generated by the generation module 218 that includes the OU signature 314, public key 316, and the name of the individual 104*c* as the identity attributes. The hashing module 220 of the processing server 102 may then apply one or more hashing algorithms to the data file to generate an identity 318 for the individual 104*c*, where the identity 318 is the resulting hash value. The identity 318 may then be provided (e.g., via electronic transmission by the transmitting device 222 of the processing server 102) to a data storage device 110 for storage in the distributed hash table as a key-value pair with the identity 318 serving as the key and the value being comprised of the identity data 306.

Process for Verification of Identity and Credentials

Figure 4:
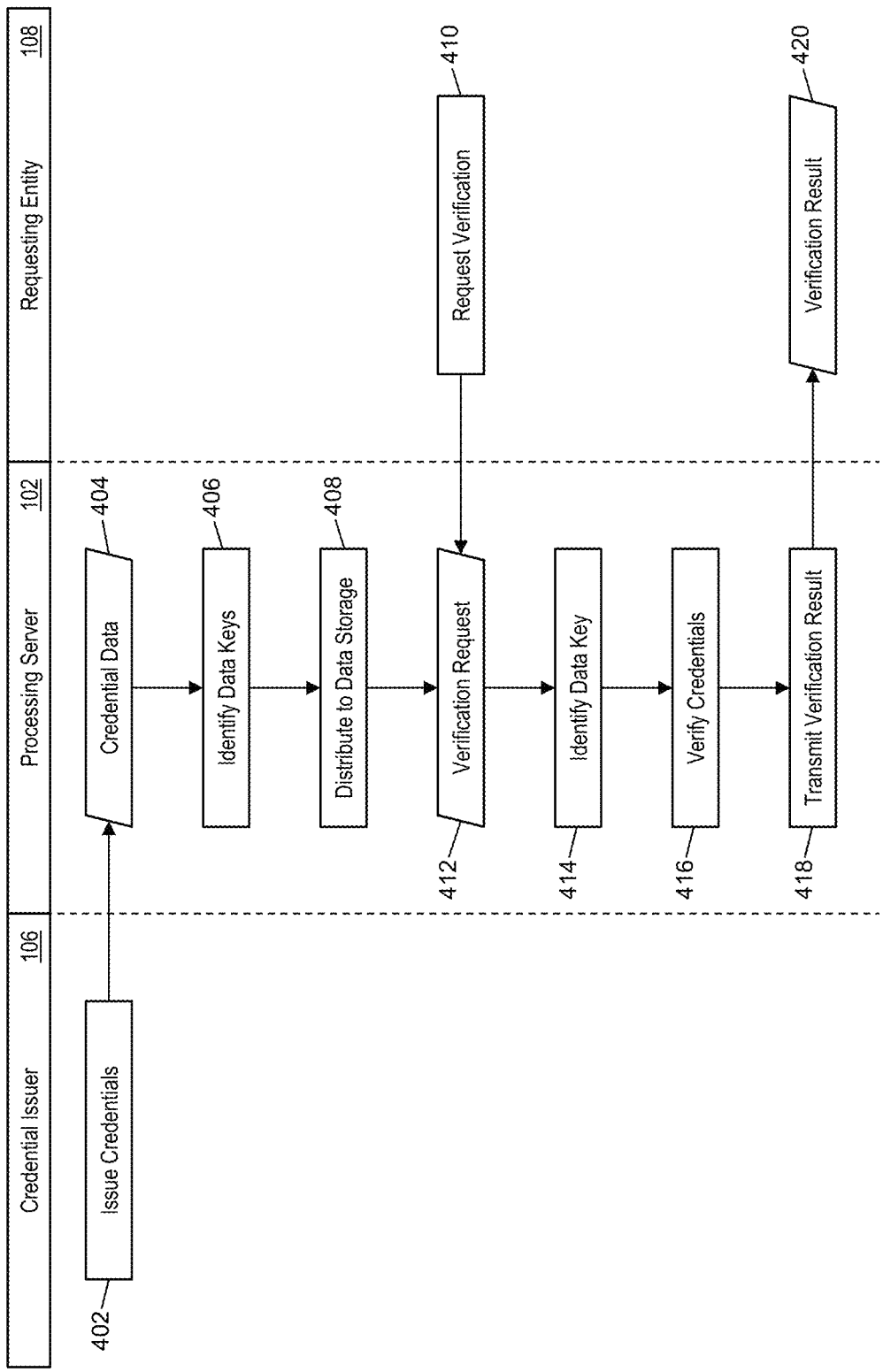
FIG. 4 is a flow diagram illustrating a process for verifying entity identity and credentials using the system of FIG. 1 in accordance with exemplary embodiments.

FIG. 4 illustrates a process for the verification of an entity's identity and credentials associated therewith using the system 100.

In step 402, a credential issuer 106 may issue credentials for an entity 104, where the credential attributes may be electronically transmitted to the processing server 102 using a suitable communication network and method. In step 404, the receiving device 202 of the processing server 102 may receive the credential data. The credential data may include, for instance, identifying information associated with the credential issuer 106, an issuance time and/or date and/or an expiration time and/or date, a claim (e.g., an assertion to which the credential applies), and an issuer signature generated by a private key associated with the credential issuer 106.

In step 406, the processing server 102 may identify a key for the credential data for use in storing the credential attributes in the distributed hash table. In some embodiments, the key may be generated by the hashing module 220 of the processing server 102 via the application of one or more hashing algorithms to a data file that is comprised of the credential data, the resulting hash value being referred to herein as the "credential," where the data file may be received from the credential issuer 106 or generated by the generation module 218 of the processing server 102. In other embodiments, the key may be provided in the credential data, such as a credential attribute being the identity of an entity 104 to which the credential data is associated, or may be identified based on data included in the credential data that identifies a specific entity 104 for whom a key exists. In step 408, the transmitting device 222 of the processing server 102 may electronically transmit the credential data to the applicable data storage device 110*a* for storage therein, where the applicable data storage device 110*a* may be the device that already stores the identified key, or is located in a geographical area 112 associated with the credential, such as may be identified in the credential data.

In step 410, a requesting entity 108 may request verification of a credential or related data presented thereto. For instance, an individual 104*c* may have received credentials from the credential issuer 106 for entry into a secured area, where the individual 104*c* may present the credentials to a guard at an access point to the secured area. The guard may, such as using a computing terminal, input a request to verify the presented credentials to the processing server 102. In step 412, the receiving device 202 of the processing server 102 may receive the verification request, which may include at least the credential to be verified.

In step 414, the processing server 102 may identify the data key associated with the received credential. In some instances, the credential may be the data key. In other instances, the data key may be the identity of an associated entity 104, which may be identified via a lookup table or other similar method for identification. In step 416, the querying module 216 may execute a query to identify the credential attributes associated with the data key, to verify that the presented credential is accurate thereto, such as by re-generating the hash value and comparing it to the presented credential. In some embodiments, verification may include review of the blockchain to identify the status of the credential in the most recent block that includes the credential, based on the status indicator associated therewith.

In step 418, the transmitting device 222 of the processing server 102 may electronically transmit the result of the verification back to the requesting entity 108. In step 420, the requesting entity 108 may receive the result. The requesting entity 108 may then proceed to act based on the result of the verification. For instance, in the above example, the individual 104*c* may be given access to or prevented from accessing the secured area on the basis of the verification of their presented credential.

Exemplary Method for Distributed Storage of Identity Data

Figure 5:
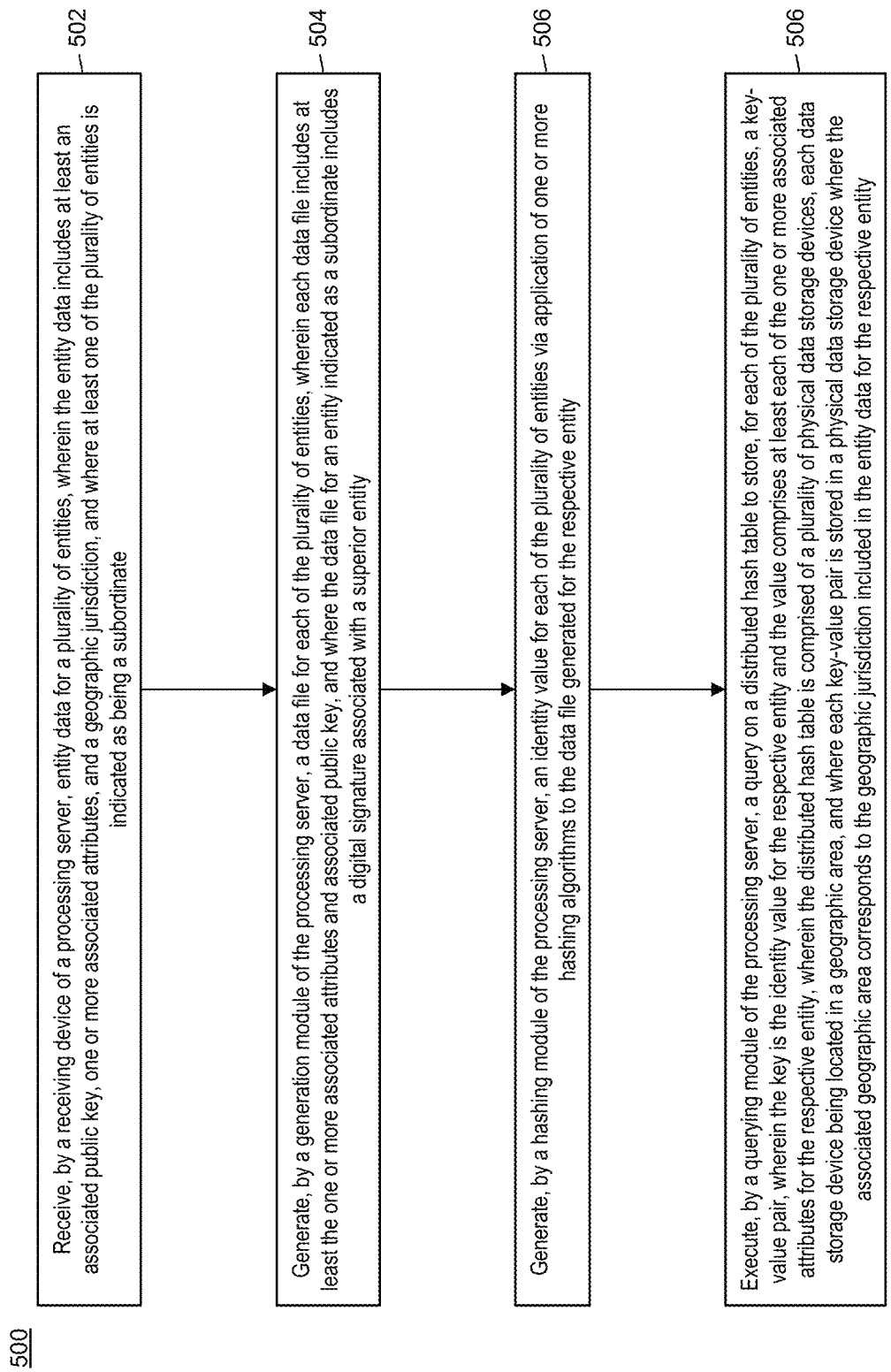
FIG. 5 is a flow chart illustrating an exemplary method for distributed storage of identity data in accordance with exemplary embodiments.

FIG. 5 illustrates a method 500 for the storage of identity data in a distributed hash table as part of a key-value pair.

In step 502, entity data may be received by a receiving device (e.g., the receiving device 202) of a processing server (e.g., the processing server 102) for a plurality of entities (e.g., entities 104), wherein the entity data includes at least an associated public key, one or more associated attributes, and a geographic jurisdiction, and where at least one of the plurality of entities is indicated as being a subordinate. In step 504, a data file may be generated for each of the plurality of entities by a generation module (e.g., the generation module 218) of the processing server, wherein each data file includes at least the one or more associated attributes and associated public key, and where the data file for an entity indicated as a subordinate includes a digital signature associated with a superior entity.

In step 506, an identity value may be generated for each of the plurality of entities by a hashing module (e.g., the hashing module 220) of the processing server via application of one or more hashing algorithms to the data file generated for the respective entity. In step 508, a query may be executed by a querying module (e.g., the querying module 216) of the processing server on a distributed hash table to store, for each of the plurality of entities, a key-value pair, wherein the key is the identity value for the respective entity and the value comprises at least each of the one or more associated attributes for the respective entity, wherein the distributed hash table is comprised of a plurality of physical data storage devices (e.g., data storage devices 110), each data storage device being located in a geographic area (e.g., geographic area 112), and where each key-value pair is stored in a physical data storage device where the associated geographic area corresponds to the geographic jurisdiction included in the entity data for the respective entity.

In one embodiment, the entity data for each entity indicated as a subordinate may include the digital signature associated with the superior entity. In some embodiments, the indication as being a subordinate may be the digital signature associated with the superior entity. In one embodiment, the superior entity may be one of the plurality of entities, and the digital signature associated with the superior entity may be generated using a private key corresponding to the associated public key included in the entity data for the superior entity. In a further embodiment, the entity data for the superior entity may include the associated digital signature.

Exemplary Method for Immutable Storage of Identity Data

Figure 6:
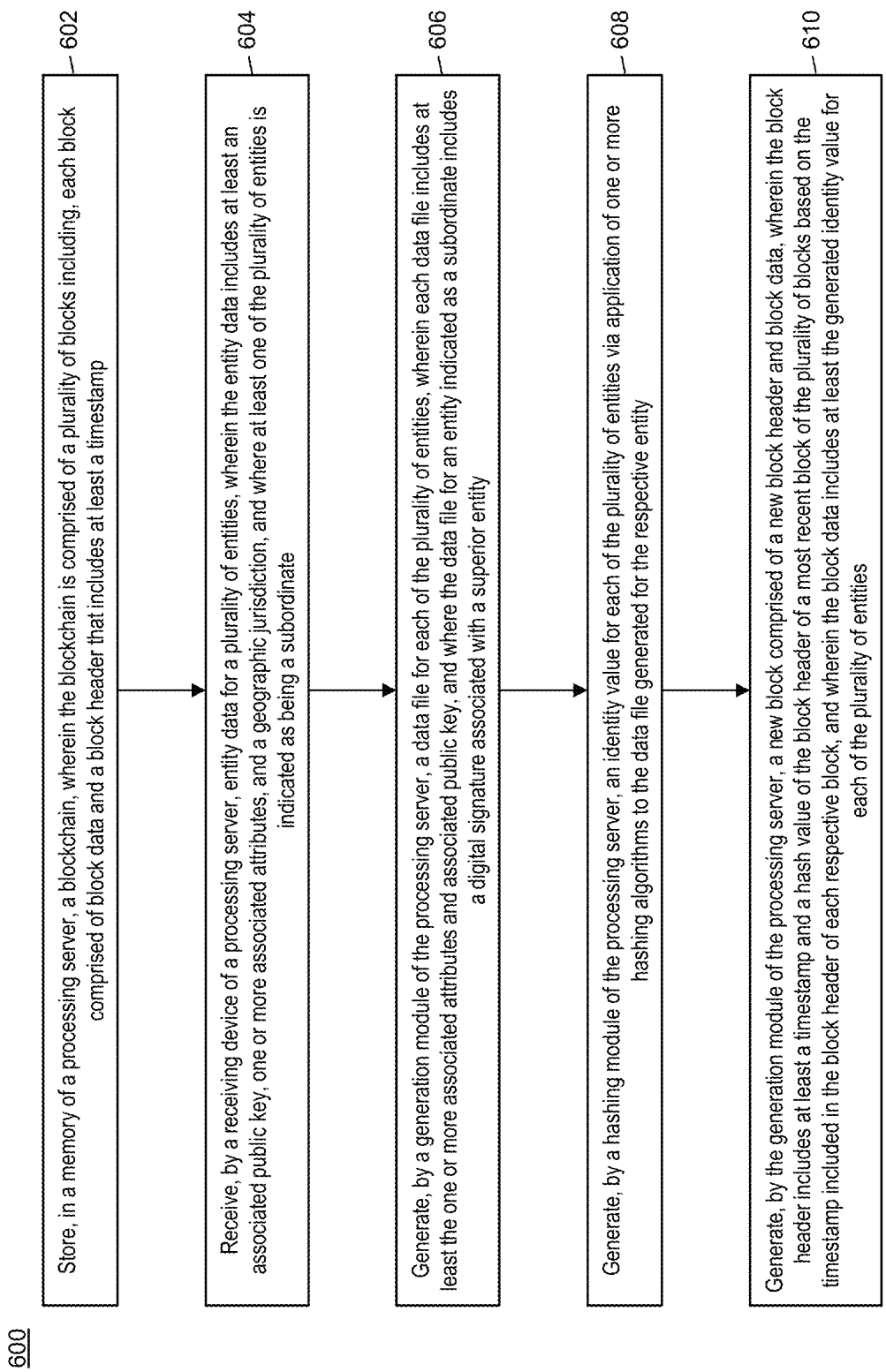
FIG. 6 is a flow chart illustrating an exemplary method for immutable storage of identity data in accordance with exemplary embodiments.

FIG. 6 illustrates a method 600 for the immutable storage of identity data in a blockchain.

In step 602, a blockchain may be stored in a memory (e.g., the memory 206) of a processing server (e.g., the processing server 102), wherein the blockchain is comprised of a plurality of blocks including, each block comprised of block data and a block header that includes at least a timestamp. In step 604, entity data for a plurality of entities (e.g., entities 104) may be received by a receiving device (e.g., the receiving device 202) of the processing server, wherein the entity data includes at least an associated public key, one or more associated attributes, and a geographic jurisdiction, and where at least one of the plurality of entities is indicated as being a subordinate. In step 606, a data file may be generated for each of the plurality of entities by a generation module (e.g., the generation module 218) of the processing server, wherein each data file includes at least the one or more associated attributes and associated public key, and where the data file for an entity indicated as a subordinate includes a digital signature associated with a superior entity.

In step 608, an identity value may be generated for each of the plurality of entities by a hashing module (e.g., the hashing module 220) of the processing server via application of one or more hashing algorithms to the data file generated for the respective entity. In step 610, a new block may be generated by the generation module of the processing server comprised of a new block header and block data, wherein the block header includes at least a timestamp and a hash value of the block header of a most recent block of the plurality of blocks based on the timestamp included in the block header of each respective block, and wherein the block data includes at least the generated identity value for each of the plurality of entities.

In one embodiment, the method 600 may further include executing, by a querying module (e.g., the querying module 216) of the processing server, a query on the memory to add the generated new block to the blockchain. In some embodiments, the method 600 may also include electronically transmitting, by a transmitting module (e.g., the transmitting device 222) of the processing server, the generated new block to a node associated with the blockchain. In one embodiment, the superior entity may be one of the plurality of entities, and the digital signature associated with the superior entity may be generated using a private key corresponding to the associated public key included in the entity data for the superior entity. In a further embodiment, the entity data for the superior entity may include the associated digital signature.

Computer System Architecture

Figure 7:
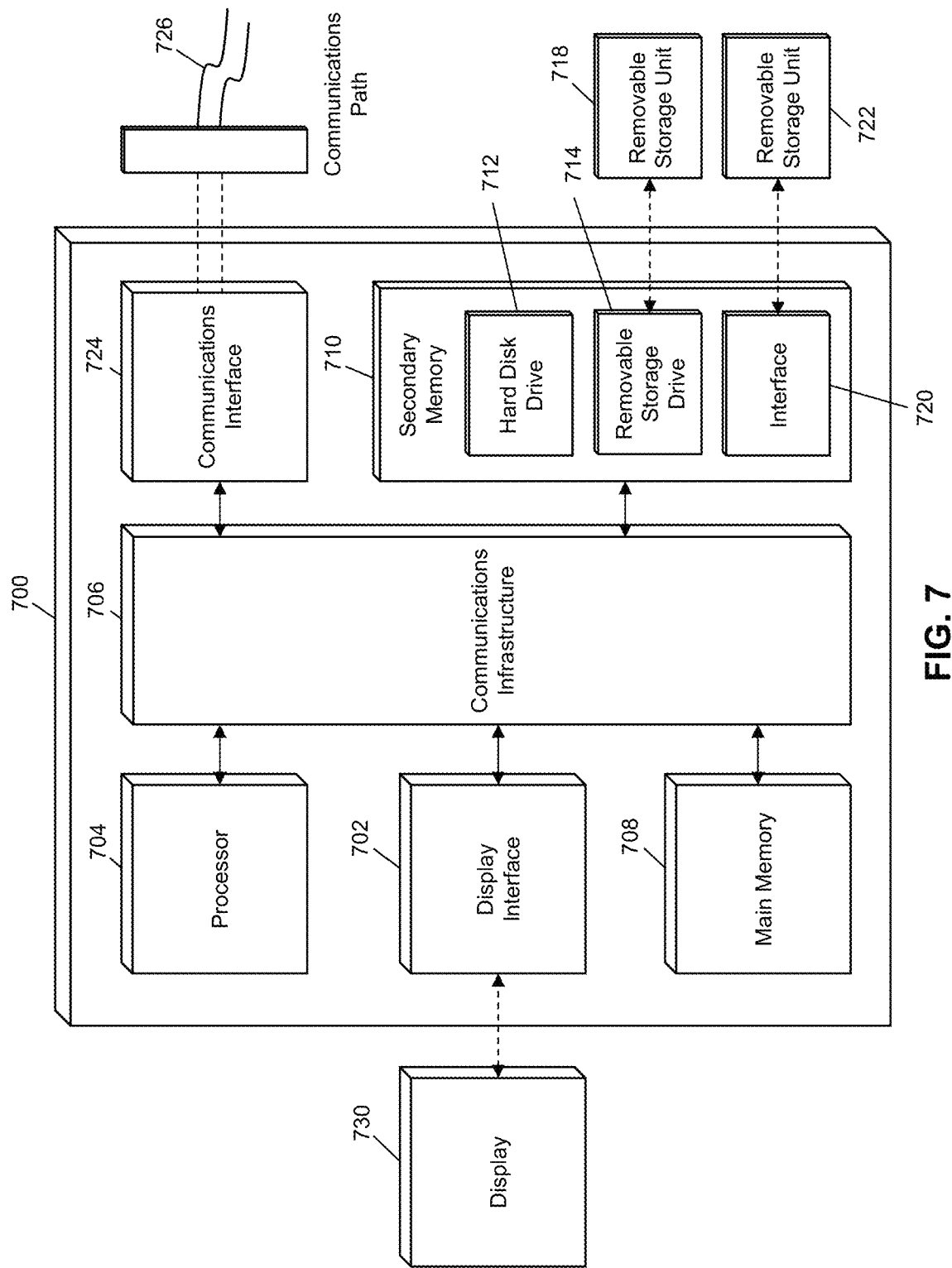
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 4-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for distributed and immutable storage of identity data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for immutable storage of identity data, comprising:

storing, in a memory of a processing server, a blockchain, wherein the blockchain is comprised of a plurality of blocks including, each block comprised of block data and a block header that includes at least a timestamp;

receiving, by a receiving device of a processing server, entity data for a plurality of entities, wherein the entity data includes at least an associated public key, one or more associated attributes, and a geographic jurisdiction, and where at least one of the plurality of entities is indicated as being a subordinate;

generating, by a generation module of the processing server, a data file for each of the plurality of entities, wherein each data file includes at least the one or more associated attributes and associated public key, and where the data file for an entity indicated as a subordinate includes a digital signature associated with a superior entity;

generating, by a hashing module of the processing server, an identity value for each of the plurality of entities via application of one or more hashing algorithms to the data file generated for the respective entity; and generating, by the generation module of the processing server, a new block comprised of a new block header and block data, wherein the block header includes at least a timestamp and a hash value of the block header of a most recent block of the plurality of blocks based on the timestamp included in the block header of each respective block, and wherein the block data includes at least the generated identity value for each of the plurality of entities.

2. The method of claim 1, further comprising:
executing, by a querying module of the processing server, a query on the memory to add the generated new block to the blockchain.

3. The method of claim 1, further comprising:
electronically transmitting, by a transmitting module of the processing server, the generated new block to a node associated with the blockchain.

4. The method of claim 1, wherein
the superior entity is one of the plurality of entities, and the digital signature associated with the superior entity is generated using a private key corresponding to the associated public key included in the entity data for the superior entity.

5. The method of claim 4, wherein the entity data for the superior entity includes the associated digital signature.

6. A system for immutable storage of identity data, comprising:

a memory of a processing server configured to store a blockchain, wherein the blockchain is comprised of a plurality of blocks, each block comprised of block data and a block header, and wherein the block header includes at least a timestamp;

a receiving device of a processing server configured to receive entity data for a plurality of entities, wherein the entity data includes at least an associated public key, one or more associated attributes, and a geographic jurisdiction, and where at least one of the plurality of entities is indicated as being a subordinate;

a generation module of the processing server configured to generate a data file for each of the plurality of entities, wherein each data file includes at least the one or more associated attributes and associated public key, and where the data file for an entity indicated as a subordinate includes a digital signature associated with a superior entity; and a hashing module of the processing server configured to generate an identity value for each of the plurality of entities via application of one or more hashing algorithms to the data file generated for the respective entity, wherein the generation module of the processing server is further configured to generate a new block comprised of a new block header and block data, wherein the block header includes at least a timestamp and a hash value of the block header of a most recent block of the plurality of blocks based on the timestamp included in the block header of each respective block, and wherein the block data includes at least the generated identity value for each of the plurality of entities.

7. The system of claim 6, further comprising:
a querying module of the processing server configured to execute a query on the memory to add the generated new block to the blockchain.

8. The system of claim 6, further comprising:
a transmitting module of the processing server configured to electronically transmit the generated new block to a node associated with the blockchain.

9. The system of claim 6, wherein
the superior entity is one of the plurality of entities, and the digital signature associated with the superior entity is generated using a private key corresponding to the associated public key included in the entity data for the superior entity.

10. The system of claim 9, wherein the entity data for the superior entity includes the associated digital signature.

* * * * *